March 8, 1949.  C. W. BRIGHAM  2,463,594
ANGLE COUNTER

Filed April 29, 1947  5 Sheets-Sheet 1

INVENTOR
CHAS. W. BRIGHAM
BY
ATTORNEY

March 8, 1949.  C. W. BRIGHAM  2,463,594
ANGLE COUNTER

Filed April 29, 1947  5 Sheets-Sheet 2

INVENTOR
CHAS. W. BRIGHAM
BY
ATTORNEY

March 8, 1949.  C. W. BRIGHAM  2,463,594
ANGLE COUNTER
Filed April 29, 1947  5 Sheets-Sheet 3

INVENTOR
CHAS. W. BRIGHAM
BY Victor D. Boras
ATTORNEY

March 8, 1949. C. W. BRIGHAM 2,463,594
ANGLE COUNTER
Filed April 29, 1947 5 Sheets-Sheet 4
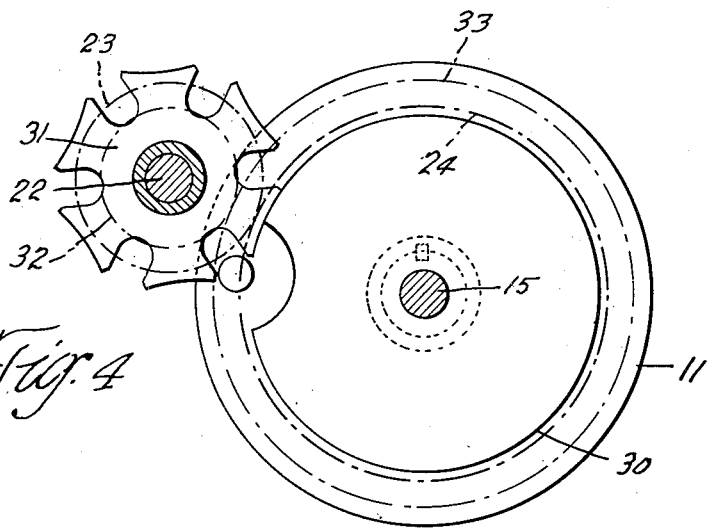
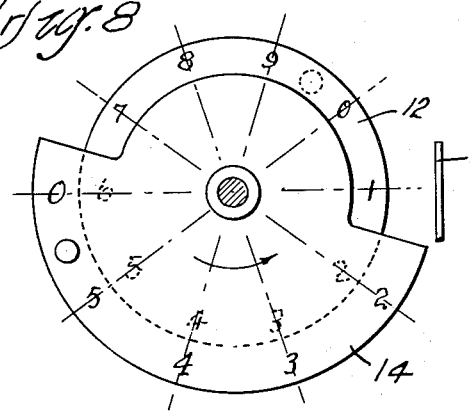 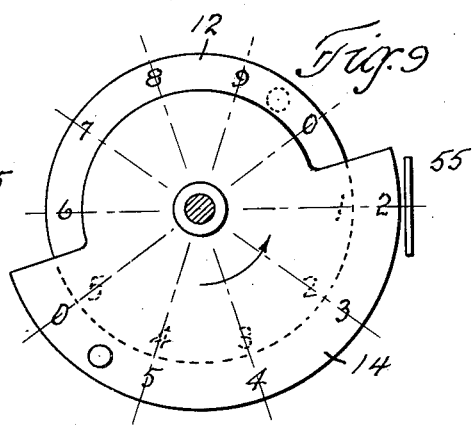
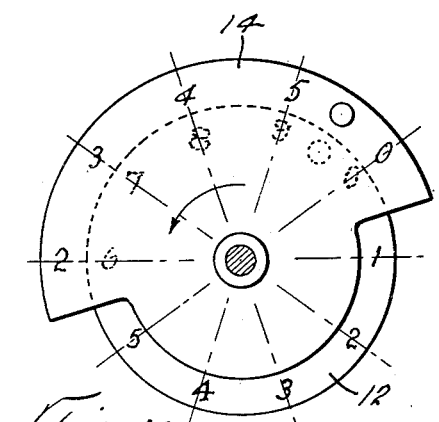 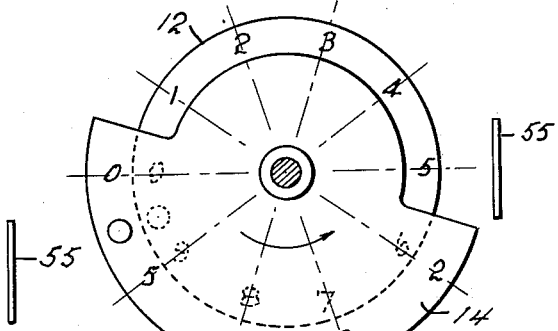
INVENTOR
CHAS. W. BRIGHAM
BY
ATTORNEY March 8, 1949.  C. W. BRIGHAM  2,463,594
ANGLE COUNTER
Filed April 29, 1947  5 Sheets-Sheet 5
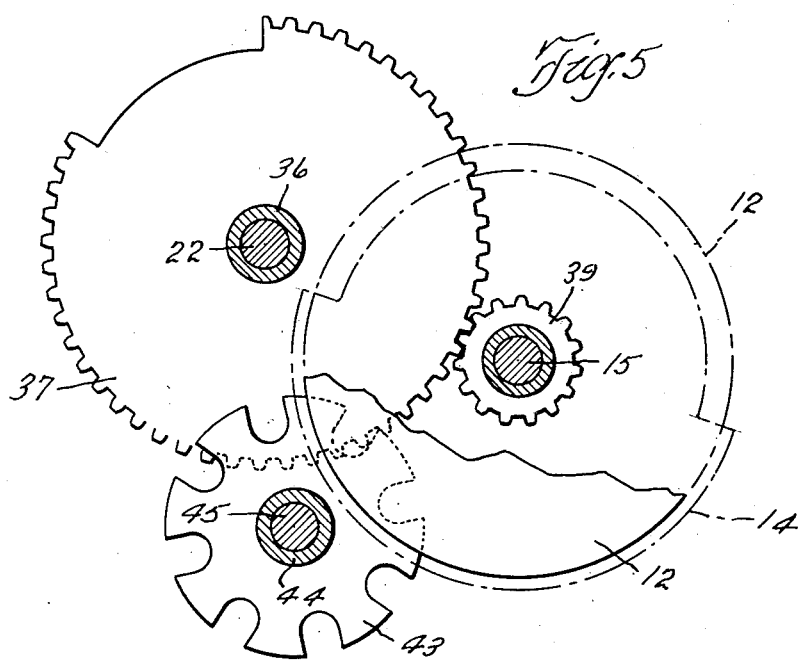
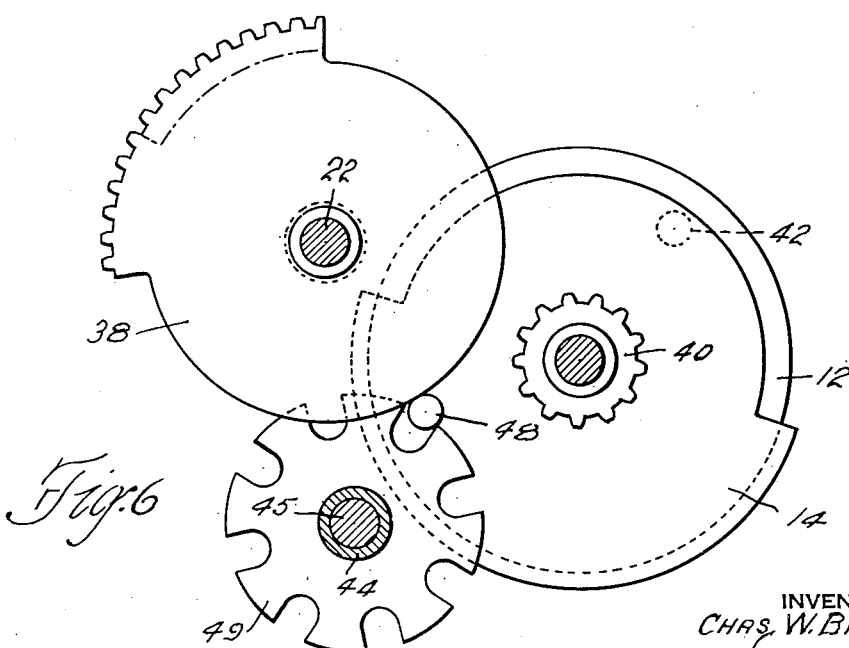
INVENTOR
CHAS. W. BRIGHAM
BY Victor D. Borst
ATTORNEY Patented Mar. 8, 1949

2,463,594

UNITED STATES PATENT OFFICE 2,463,594

ANGLE COUNTER

Charles W. Brigham, Arlington, N. J., assignor to Kearfott Company, Inc., New York, N. Y., a corporation of New York Application April 29, 1947, Serial No. 744,726

4 Claims. (Cl. 235—103)

This invention relates to an angle counter and more particularly to a counter for registering angular degrees.

An object of the invention is to provide a device of the above type which automatically resets itself to zero when the 360° point is reached.

Another object is to provide a counter of the above type which is adapted to count and register angular degrees from zero to 360 in a repeated cycle.

Another object is to provide a device of the above type which is simple and compact, and is suited for commercial use.

Various other objects and advantages will be apparent as the nature of the invention is more fully disclosed.

In accordance with the present invention the angle counter comprises a plurality of index drums, such as four drums having scales graduated to read minutes of angle and units, tens and hundreds of degrees, respectively. The minute drum scale is graduated from zero to 60 around the periphery of the drum and is driven to make a complete revolution for each 60 minutes of angle to be counted. The units and tens drums are provided with scales graduated from 0 to 9 around their peripheries and the hundreds drum is preferably provided with a scale graduated from 0 to 3 around each 180° of its periphery so that it makes one complete revolution for 720° of angle.

In order to reset the various drums to 0 at the 360° point, a segment shield is provided extending around a portion of the periphery of the tens drum and having a scale graduated to read 2—3—4—5—0. The segment shield is adapted to conceal the tens drum during its operating cycle.

Suitable transfer mechanism is provided between the various drums so that in normal operation the unit drum is advanced one step for each revolution of the minute drum. The tens drum, however, advances one step for each of the 30 revolutions of the units drum between the 10° and 310° points and then remains at rest during 6 revolutions of the units drum from the 310° point through 0 to the 10° point. During this 60 angular degree range the segment shield is advanced one step for each revolution of the units drum to provide the tens designation representing 320°, 330°, 340°, 350°, and 0°. The shield makes one complete revolution and then remains at rest while the tens drum again operates in the next 10° to 310° range. Transfer means are provided to advance the hundreds drum one position in response to each revolution of the tens drum and of the shield.

Although the novel features which are characteristic of this invention are pointed out more particularly in the claims, the nature of the invention will be better understood by referring to the following description taken in connection with the accompanying drawings in which a specific embodiment thereof has been set forth for purposes of illustration.

Figure 1:
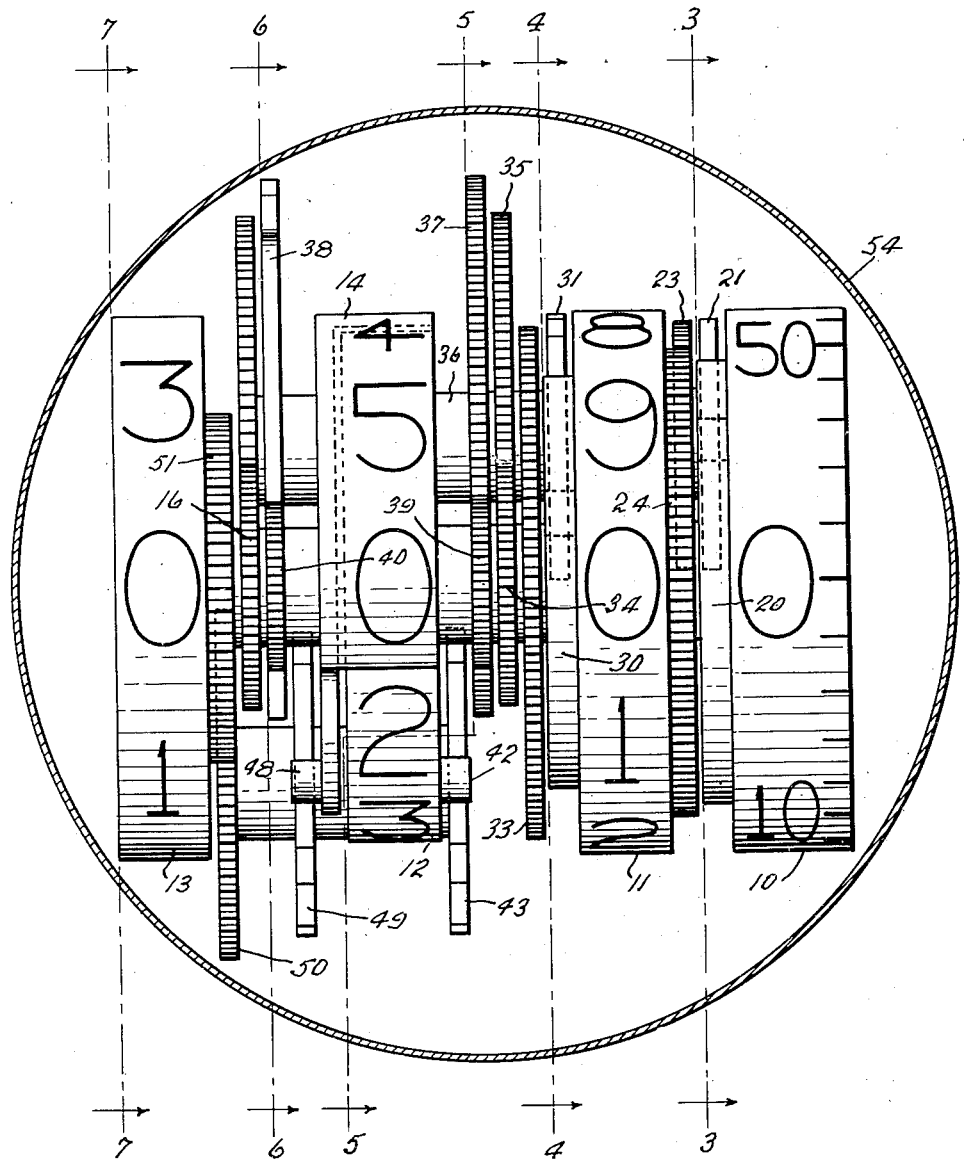
Fig. 1 is an elevation of a counter embodying the present invention with the housing in section to show the drums and transfer gears.
Figure 2:
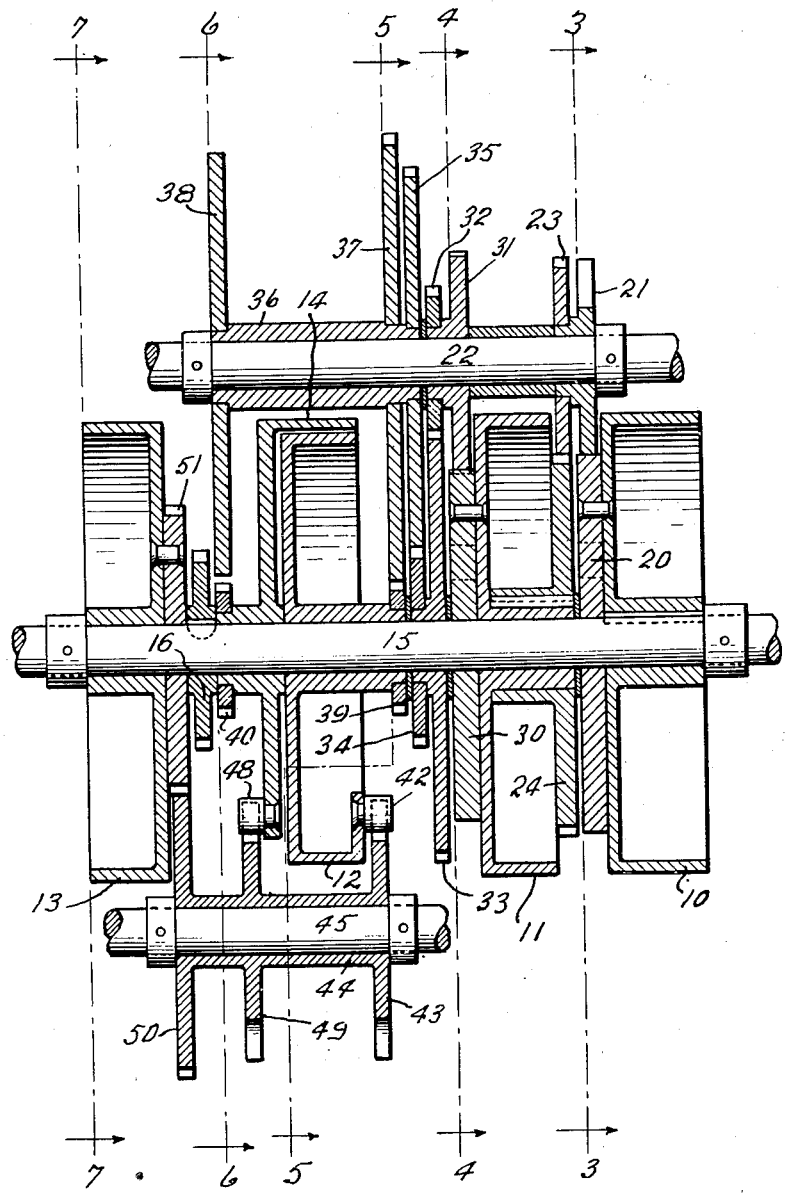
Fig. 2 is a diagrammatic longitudinal sectional view showing the various shafts, for purposes of illustration, as shifted into the same plane as indicated by the line 2—2 of Fig. 7.
Figure 7:
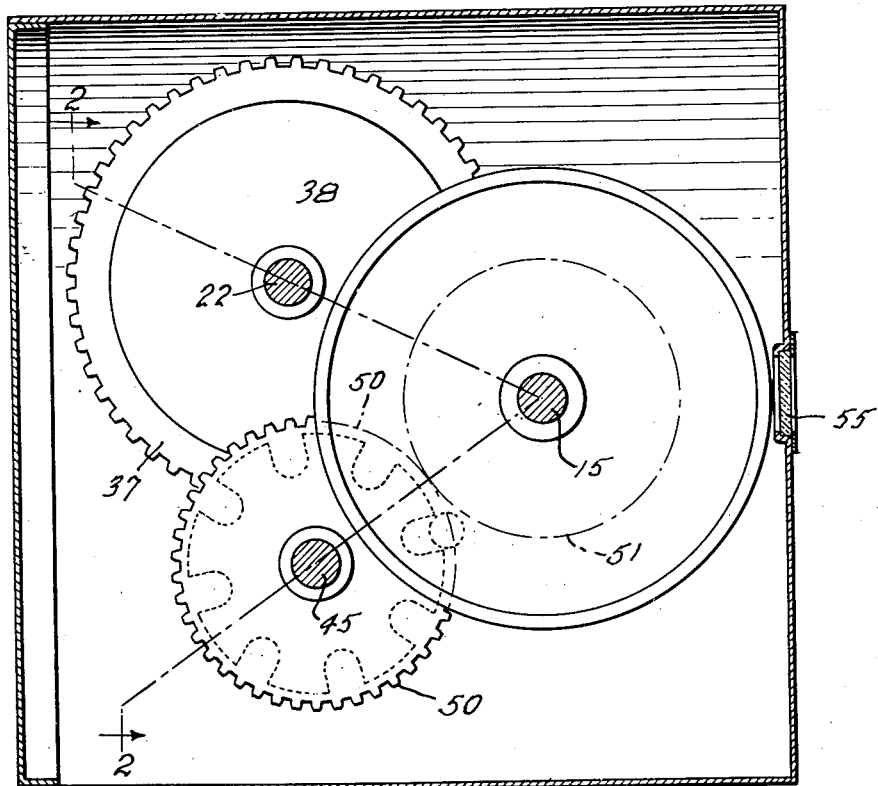
Figure 3:
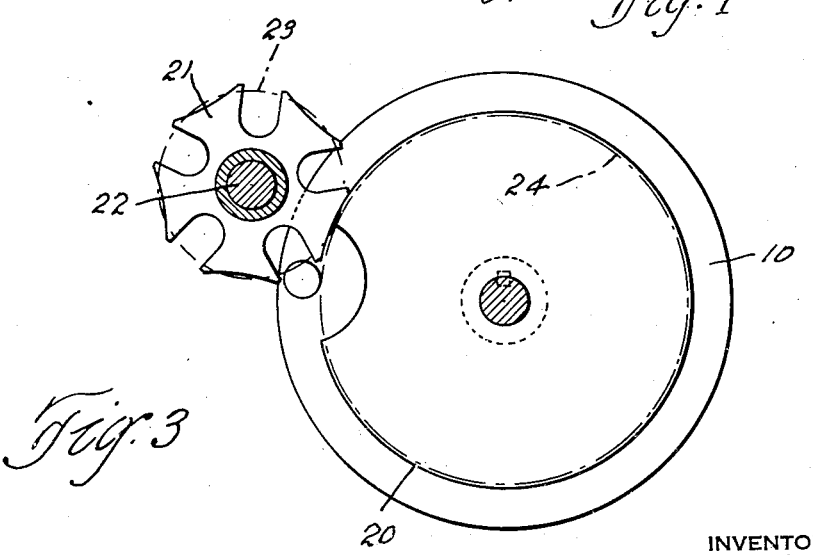

Figs. 3 to 7 are transverse sections taken on the lines 3—3 to 7—7 inclusive of Figs. 1 and 2; and Figs. 8, 9, 10 and 11 are diagrammatic views illustrating successive positions of the segment shield.

Referring to the drawings more in detail, a minute drum 10 is shown as provided with a peripheral scale graduated from 0 to 59. A units drum 11 is provided with a peripheral scale graduated from 0 to 9. A tens drum 12 is likewise provided with a peripheral scale graduated from 0 to 9, and a hundreds drum 13 is provided with a pair of peripheral scales each graduated from 0 to 3. A segment shield 14 extends over a portion of the periphery of the tens drum 12 and carries designations 2—3—4—5—0 which cover five positions of the tens drum scale.

The minute drum 10 is keyed to a drive shaft 15. The drums 11, 12 and 13 and shield 14 are loosely journaled on the shaft 15. An input gear 16 is also keyed to the shaft 15 and provides means for driving the shaft. The shaft may, however, be driven by any suitable means and is geared to the driving member so that one revolution of the shaft 15 represents one angular degree of movement of the driving member.

The drum 10 carries a Geneva drive 20 driving a Geneva gear 21 which is loosely journaled on a shaft 22. The Geneva gear 21 carries a spur gear 23 meshing with a gear 24 carried by the drum 11. The Geneva gear 21 is shown as provided with five slots so that it makes one complete revolution for each five revolutions of the minute drum 10. The gears 23 and 24 have a 2:1 ratio so that the units drum 11 makes one complete revolution for each ten revolutions of the minute drum 10.

The unit drum 11 carries a Geneva drive 30 meshing with a Geneva gear 31 which is journaled on the shaft 22 and carries a pinion 32 meshing with a gear 33 loosely journaled on the shaft 15. The gear 33 carries a pinion 34 meshing with a gear 35 attached to a sleeve 36 journaled on the shaft 22 and carrying segment gears 37 and 38. In the embodiment shown the Geneva gear 31 is provided with six slots so that it makes one revolution to each six revolutions of the unit drum 11. The gears 32 and 33 have a 3:1 ratio and the gears 34 and 35 have a 2:1 ratio so that the gear 35 makes a complete revolution for each 36 revolutions of the unit drum 11.

The gear 37 is provided with teeth around 300° of its periphery which mesh with a pinion 39 attached to the tens drum 12. The gear 38 is provided with teeth around 100° of its periphery which mesh with a pinion 40 attached to the segment shield 14.

The tens drum 12 is provided with a Geneva drive 42 meshing with a Geneva gear 43 carried on a sleeve 44 journaled on a shaft 45. The segment shield 14 carries a Geneva drive 48 meshing with a Geneva gear 49 carried on the sleeve 44. The sleeve 44 also carries a pinion 50 meshing with a gear 51 carried by the hundreds drum 13. The Geneva gears 43 and 49 are provided with eight slots each so that they make one revolution for each eight revolutions of the tens drum 12 and segment shield 14. The gears 50 and 51 have a 1:1 ratio so that the hundreds drum 13 likewise makes one revolution for each eight revolutions of the tens drum 12 and segment shield 14. The device is enclosed in a casing 54 having a window 55 through which the drum scales are viewed.

The Geneva transfer gears are so designed that the unit drum 11 is advanced one position for each revolution of the minute drum 10. The tens drum 12 or the segment shield 14 is advanced one position for each revolution of the units drum 11, and the hundreds drum 13 is advanced one position for each revolution of the tens drum 12 or of the segment shield 14. The tens drum 12 is advanced from a position representing 10° to a position representing 310° which corresponds to three complete revolutions of the tens drum 12. At the 310° reading the numeral 1 appears on the tens drum 12. The tens drum 12 is rotated through three complete revolutions during 300° of movement of the segment gear 37. The teeth of the segment gear 37 then run out of mesh with the gear 39 leaving the tens drum 12 stationary in the one position. The tens drum and shield are now in the relative positions shown in Fig. 8 in which the numeral 1 appears on the tens drum 12 before the window 55 and the leading edge of the shield 14 is just below the window 55.

The segment gear 38 is so positioned with relation to gear 37 that its teeth come into mesh with the pinion 40 when the teeth of the gear 37 run out of mesh with the pinion 39. Continued actuation of the transfer mechanism by the units drum 11 then advances the shield 14 from the position of Fig. 8 to the position shown in Fig. 9 while the tens drum 12 remains stationary. In this position the numeral 2 on the shield 14 appears before the window 55 and the numeral 1 on the stationary tens drum is concealed by the shield. Hence the 2 for the 320° reading appears on the shield 14. The shield 14 is then stepped around to indicate 330°, 340° and 350°. At the next actuation of the shield 14 the 0 is brought in front of the window 55. As the shield 14 moves from the 5 to the 0 position, the Geneva drive 48 and 49 is actuated to shift the hundreds drum 13 from the 3 position to the zero position so that the counter is caused to read 0, 0, 0, 0, at the position corresponding to 0° or 360°.

At the next actuation of the Geneva drive 30, 31, the shield advances beyond the window 55 and exposes the 1 on the tens drum 12 as indicated in Fig. 10. The counter now registers 10°. At this point the gear 37 again comes into mesh with the gear 39 so that the tens drum 12 is driven through three revolutions to indicate from 10° to 310° as previously described. The shield 14, however, continues to be driven by the gear 38 until its leading edge is again brought just below the window 55 as indicated in Fig. 11. At this point the gear 38 runs out of mesh with the gear 40 and the shield remains stationary until it is again picked up at the 310° point.

From the above description it will be evident that as the shaft 15 is rotated the counter will register the degrees until the 359° point is reached and will then reset itself at 0. It is to be understood that the Geneva transfer gear is shown for purposes of illustration and that other types of transfer connections may be employed for stepping the respective drums around one position for each complete rotation of the preceding drum.

While the invention has been shown as applied to a 360° angle counter it may be embodied in other counters which register numerals other than straight decimals. A specific embodiment of the invention has been shown for purposes of illustration. It is to be understood, however, that the invention is capable of various uses and that suitable adaptations may be made therein as will be readily apparent to a person skilled in the art. The invention is only to be restricted in accordance with the scope of the following claims.

What is claimed is:

1. A counter of the class described comprising a shaft the unit movements of which are to be counted, a series of index members carrying designations indicating said counted unit movements, means connecting said shaft to a first index member to advance said first member one step for each unit movement of said shaft, transfer mechanism interconnecting said first member and a second index member to advance the second index member one step for each of a predetermined number of unit movements of said first index member and to leave said second index member at rest during a second predetermined number of unit movements of said first index member, a shield having an index area covering a portion of the index area of said second index member and normally positioned out of registration therewith, transfer mechanism to advance said shield step-by-step in response to said second number of unit movements of said first index member while said second index member is at rest, and transfer mechanism connected to advance a third index member one step for each revolution of said second index member and also for each revolution of said shield.

2. A counter of the class described comprising a shaft, the rotations of which are to be counted, a series of index members carrying designations indicating respectively units, tens and hundreds, means connecting said shaft to the units index member to advance said unit member one step for each unit movement of said shaft, transfer mechanism interconnecting the units and tens index members to advance the tens index member one step for each of a predetermined number of unit movements of said units index member and to leave said tens index member at rest during a second predetermined number of unit movements of said units index member, a shield having an index area covering a portion of the index area of said tens index member and normally positioned out of registration therewith, transfer mechanism timed with said last transfer mechanism to advance said shield step-by-step in response to said second number of unit movements of said unit index member while said tens index member is at rest, and transfer mechanism to advance said hundreds index member one step for each rotation of said tens index member and also for each rotation of said shield.

3. A 360° counter comprising a shaft the angular rotation of which is to be counted, a series of drums carrying designations corresponding respectively to units, tens and hundreds, a segmental shield covering a portion of the peripheral designations of said tens drum and journaled for rotation thereabout and carrying designations representing a portion of the tens scale, first transfer mechanism to advance said tens drum in response to rotation of said units drum for indicating tens, said first transfer mechanism having means to interrupt the movement of said tens drum between predetermined angular designations and to advance said shield in response to rotation of said units drum during said periods of rest of said tens drum whereby during said periods the tens designation appears on said shield, second transfer mechanism to advance said hundreds drum in response to rotation of said tens drum and third transfer mechanism to advance said hundreds drum in response to rotation of said shield.

4. A 360° angle counter as set forth in claim 3 in which said first transfer mechanism actuates said tens drum to indicate the tens digits from a 10° designation to a 310° designation of the counter and causes said tens drum to remain at rest from the 310° designation through 0 to the 10° designation of the counter, and actuates said shield to indicate the tens digit between the 320° angle designation through the 0 designation of the counter, and said third transfer mechanism interconnects said shield and said hundreds drum to step said hundreds drum from the 3 designation to 0 designation when the shield is stepped to said 0 designation position.

CHARLES W. BRIGHAM.

REFERENCES CITED

The following references are of record in the file of this patent:

UNITED STATES PATENTS

| Number | Name | Date |
|---|---|---|
| 1,738,558 | Berge | Dec. 10, 1929 |
| 2,279,456 | Friden et al. | Apr. 14, 1942 |
| 2,351,814 | Holzner | June 20, 1944 |
| 2,420,808 | Bliss | May 20, 1947 |